United States Patent [19]

Klein et al.

[11] Patent Number: 4,697,841

[45] Date of Patent: Oct. 6, 1987

[54] ADHESIVE CONNECTION ARRANGEMENT FOR A WINDSHIELD HELD ON A BODY OF A MOTOR VEHICLE

[75] Inventors: Norbert Klein, Sindelfingen; Jochen Pärisch, Herrenberg; Gerhard Zweigart, Aidlingen, all of Fed. Rep. of Germany

[73] Assignee: Daimler-Benz Aktiengesellschaft, Fed. Rep. of Germany

[21] Appl. No.: 860,566

[22] Filed: May 7, 1986

[30] Foreign Application Priority Data

May 7, 1985 [DE] Fed. Rep. of Germany ....... 3516345

[51] Int. Cl.$^4$ .............................................. B60J 1/02
[52] U.S. Cl. .................................. 296/84 R; 296/201; 52/208
[58] Field of Search ...................... 296/84 R, 93, 201; 52/208

[56] References Cited

U.S. PATENT DOCUMENTS

| 4,168,858 | 9/1979 | Inamoto | 296/84 R |
| 4,487,448 | 12/1984 | Griffin | 296/84 R |
| 4,571,278 | 2/1986 | Kunert | 296/84 R |
| 4,606,159 | 8/1986 | Kunert | 52/208 |

FOREIGN PATENT DOCUMENTS

| 0148797 | 1/1985 | European Pat. Off. . |
| 888873 | 2/1962 | United Kingdom . |
| 1036305 | 7/1966 | United Kingdom . |
| 1066822 | 4/1967 | United Kingdom . |
| 1410616 | 10/1975 | United Kingdom . |
| 1423818 | 2/1976 | United Kingdom . |
| 1483784 | 8/1977 | United Kingdom . |

*Primary Examiner*—Robert R. Song

[57] ABSTRACT

The invention relates to suction cups attached to the body of a motor vehicle for positioning the windshield during the hardening of an adhesive between the windshield and the body of the motor vehicle. The suction cups ensure a quick and accurate assembly of the windshield by maintaining a fixed position of the windshield during the hardening of the adhesive.

7 Claims, 1 Drawing Figure

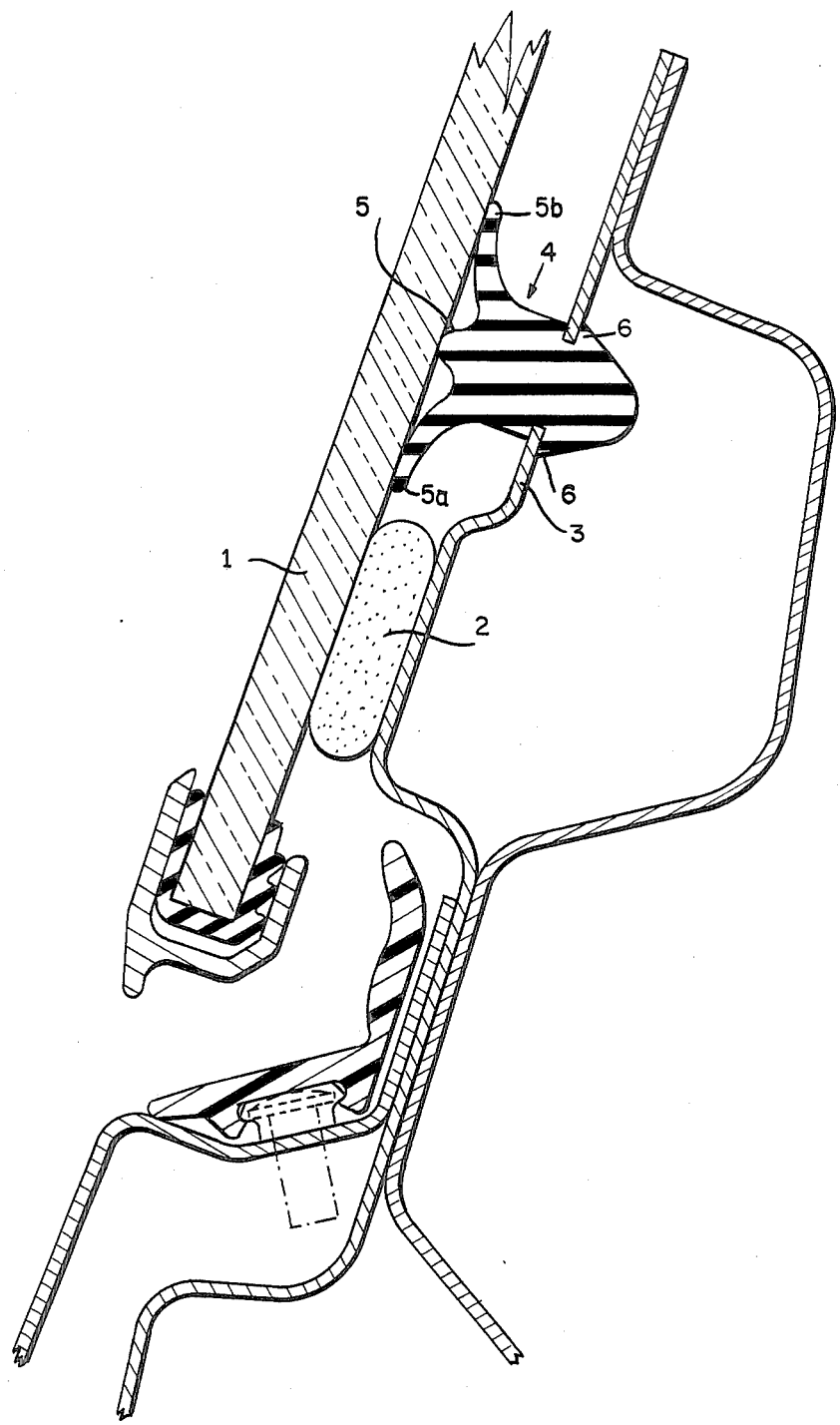

ADHESIVE CONNECTION ARRANGEMENT FOR A WINDSHIELD HELD ON A BODY OF A MOTOR VEHICLE

BACKGROUND OF THE INVENTION

The invention relates to a positioning device for a front and rear windshield of a motor vehicle. The positioning device holds the windshield in position with respect to a body of a motor vehicle, during the hardening of an adhesive. The adhesive is also positioned between the windshield and the body of the motor vehicle.

According to the known art, adjustable stops on the body of the vehicle have been used for positioning the windshield during the hardening of the adhesive. These adjustable stops are removed and placed on the lower edge of the windshield after installation of the windshield. The adjustable stops are then fixed by means of screws at the lower edge of the windshield. A disadvantage of this method is that it is time consuming to move the stops and fix them at the lower edge of the windshield with screws. Additionally, this method does not always serve to ensure the required accuracy in the installation of the windshield.

It is therefore an objective of the present invention to avoid these disadvantages and to create a positioning device which enables the windshield to be assembled quickly and accurately without any adjusting of the stops.

This objective is achieved according to a preferred embodiment of the invention by providing elastic suction cups fixed to the body of the motor vehicle which position the windshield during the hardening of the adhesive.

According to a preferred embodiment of the invention, the suction cups are attached to the body of a motor vehicle by a clip connection.

According to certain preferred embodiments of the invention, the suction cups are provided with central spacer projections. These spacer projections permit a particularly accurate setting of the preferred distance between the windshield and the body of the motor vehicle.

Other objects, advantages and novel features of the present invention will become apparent from the following detailed description of the invention when considered in conjunction with the accompanying drawing.

BRIEF DESCRIPTION OF THE DRAWING

The single drawing FIGURE is a sectional schematic view of an upper edge area of a rear windshield of a motor vehicle depicting an arrangement for positioning a windshield of a motor vehicle in accordance with a preferred embodiment of the invention.

DETAILED DESCRIPTION OF THE DRAWING

In the drawing, the rear windshield 1 is positioned a distance from a sheet 3 during the hardening of an adhesive connection 2 by means of suction cups 4. The sheet 3 is fixed to the body of the motor vehicle and the suction cups 4 are attached to the sheet 3. Each suction cup is clipped into a bore of the sheet 3 by means of inserting a shoulder 6 of the suction cup 4 into the bore.

When hardened, the adhesive connection 2 connects the rear windshield 1 to the sheet 3 attached to the body of the motor vehicle. The suction cup 5 remains in position after the adhesive 2 hardens, eliminating the time-consuming step in the prior art of removing the adjustable stops and fixing them by means of screws at the lower edges of the windshield. The number and position of the suction cups 4 depends on the size of the windshield to be positioned and the constructional conditions.

According to another preferred embodiment of the invention, suction cups 4 each have a central spacer projection 5 which acts as a depth stop for the windshield. The central spacer projections accurately maintain the windshield a specified design distance from the body of the motor vehicle, accomodating flexure movement of the suction cups 4 at ends 5a and 5b. Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Positioning means for positioning a windshield of a motor vehicle a predetermined distance from a body of the motor vehicle during hardening of an adhesive means, said adhesive means being also positioned between the windshield and the body, wherein said positioning means comprises suction means fixed to the body of the motor vehicle.

2. A positioning means according to claim 1, wherein said suction means comprises suction cups.

3. Positioning means according to claim 2, wherein said suction means are fixed to the body by a clip means.

4. Positioning means according to claim 3, wherein said clip means comprises a shoulder means of the suction means and bore means in the body of said motor vehicle, wherein said shoulder means is clipped into said bore means.

5. Positioning means according to claim 4, wherein said suction means is clipped into a sheet means which is fixed to the body of the motor vehicle.

6. Positioning means according to claim 5, wherein the adhesive means is positioned between the windshield and the sheet means.

7. Positioning means according to claim 6, wherein said suction means includes a central spacer projection means.

* * * * *